United States Patent
Hsu et al.

(10) Patent No.: US 9,524,000 B2
(45) Date of Patent: *Dec. 20, 2016

(54) PIVOT MECHANISM OF SYNCHRONOUS HINGE DEVICE

(71) Applicant: FIRST DOME CORPORATION, New Taipei (TW)

(72) Inventors: An Szu Hsu, New Taipei (TW); Wang Jui Lee, New Taipei (TW); Chung Yi Lin, New Taipei (TW); Ya Ching Lin, New Taipei (TW)

(73) Assignee: First Dome Corporation, New Taipei (TW)

( * ) Notice: Subject to any disclaimer, the term of this patent is extended or adjusted under 35 U.S.C. 154(b) by 172 days.

This patent is subject to a terminal disclaimer.

(21) Appl. No.: 14/486,072

(22) Filed: Sep. 15, 2014

(65) Prior Publication Data

US 2016/0010374 A1 Jan. 14, 2016

(30) Foreign Application Priority Data

Jul. 14, 2014 (TW) .............................. 103124100 A

(51) Int. Cl.
*E05D 3/06* (2006.01)
*H05K 5/02* (2006.01)
*G06F 1/16* (2006.01)

(52) U.S. Cl.
CPC ....................................... *G06F 1/16* (2013.01)

(58) Field of Classification Search
CPC ............. E05D 3/12; E05D 3/122; E05D 3/06; E05D 3/10; E05D 11/087; G06F 1/1681; G06F 1/1616; G06F 1/1618; G06F 1/168; E05Y 2900/606; E05Y 2900/602; H04M 1/0216; H04M 1/0222; H04M 1/022; H05K 5/0226; Y10T 16/547; Y10T 16/5837; Y10T 16/53864; Y10T 16/541; Y10T 16/540255; Y10T 16/533; Y10T 16/5938

See application file for complete search history.

(56) References Cited

U.S. PATENT DOCUMENTS

| | | | |
|---|---|---|---|
| 6,176,044 B1 * | 1/2001 | Nixon | E05F 15/614 49/334 |
| 2005/0050686 A1 * | 3/2005 | Kurokawa | G06F 1/1618 16/354 |
| 2006/0238968 A1 * | 10/2006 | Maatta | H04M 1/0218 361/679.01 |
| 2011/0289728 A1 * | 12/2011 | Wang | E05D 3/122 16/337 |

(Continued)

*Primary Examiner* — Chuck Mah
(74) *Attorney, Agent, or Firm* — Rosenberg, Klein & Lee

(57) ABSTRACT

A pivot mechanism of the synchronous hinge device is applied to a foldable electronic apparatus. The pivot mechanism can be stably rotated and the distance between two shafts of the dual-shaft hinge is shortened, whereby the electronic device can be smoothly rotated and have a miniaturized and lightweight structure. The pivot mechanism includes a driver disposed on a first shaft and a reactor disposed on a second shaft and a link unit. Spur gears and conical (bevel) gears are respectively disposed at two ends of the link unit and the driver and the reactor. The Spur gears and conical (bevel) gears are engaged with each other to transmit power, whereby the first shaft with the driver and the second shaft with the reactor can be stably synchronously rotated in reverse directions.

26 Claims, 5 Drawing Sheets

(56) References Cited

U.S. PATENT DOCUMENTS

| | | | | |
|---|---|---|---|---|
| 2013/0016489 A1* | 1/2013 | Yeh | G06F 1/1681 | 361/807 |
| 2013/0318746 A1* | 12/2013 | Kuramochi | G06F 1/1681 | 16/342 |
| 2014/0251045 A1* | 9/2014 | Hsu | G06F 1/1681 | 74/96 |
| 2014/0360296 A1* | 12/2014 | Hsu | E05D 3/122 | 74/98 |
| 2014/0373654 A1* | 12/2014 | Hsu | G06F 1/1681 | 74/96 |
| 2015/0047152 A1* | 2/2015 | Cheng | E05D 3/122 | 16/354 |
| 2015/0159413 A1* | 6/2015 | Chen | G06F 1/1618 | 16/342 |
| 2015/0173218 A1* | 6/2015 | Hsu | E05D 3/12 | 16/366 |
| 2015/0189777 A1* | 7/2015 | Hsu | H05K 5/0226 | 16/366 |

* cited by examiner

PIVOT MECHANISM OF SYNCHRONOUS HINGE DEVICE

BACKGROUND OF THE INVENTION

1. Field of the Invention

The present invention relates to a pivot mechanism of synchronous hinge device.

2. Description of the Related Art

Along with the development of electronic apparatuses, various hinge devices have been developed and applied to panel products. By means of the hinge device, an electronic product composed of two foldable parts can be relatively 360-degree folded back onto itself. The electronic product can be smoothly rotated to a 360-degree fully opened position or rotated to a 0-degree fully closed position or rotated to any angular position therebetween and kept partially opened. Many kinds of synchronous or asynchronous hinge mechanisms have been developed and applied to the electronic products. A conventional synchronous hinge device includes multiple gears engaged with each other to synchronously open/close the two foldable parts of the electronic apparatus.

In order to conveniently carry and use the foldable electronic apparatus such as a notebook, the electronic apparatus has become lighter and lighter, thinner and thinner and smaller and smaller. For synchronously operating the two shafts of the dual-shaft hinge of the electronic apparatus, a gear transmission mechanism is generally employed and applied to the dual-shaft hinge. In general, the end sections of the two shafts are provided with driving gears and a middle gear set is used to transmit the power. In the case that a traditional spur gear mechanism is used for transmitting the power, the gear thickness or tooth face length of the engaged spur teeth has better allowable miniaturization condition and the axial engagement position between the teeth provides less restriction. However, it is still necessary to keep a full gap between the engaged teeth for smoothening the operation. This will lead to greater error in transmission. This not only affects the stability of the synchronous transmission between the transmission gears, but also lowers the possibility of shortening of the distance between the axes of the two parallel shafts. As a result, the miniaturization of the volume and thickness of the dual-shaft hinge is greatly limited. This obviously is unbeneficial to the requirement of lightweight and thinning of the entire electronic apparatus.

Alternatively, in order to synchronously rotate the two shafts of the dual-shaft hinge, two opposite guide threaded rods are disposed on the rotary shafts. A slide member or a roller member is assembled between the two guide threaded rods as a synchronous transmission member. During the reciprocal displacement of the slide block between the guide threaded rods, the slide block moves along the spiral grooves of the guide threaded rods of the two rotary shafts to synchronously rotate the two rotary shafts. On one hand, the slide member or the roller member is engaged in the spiral grooves of the guide threaded rods to reciprocally move and on the other hand, the slide member or the roller member needs to have a move tolerance. Therefore, a gap may exist between the guide threaded rods and the slide block. In the synchronous mechanism, such gap often leads to shake and displacement of the rotary shafts. As a result, the rotary shafts can be hardly stably operated. When the electronic apparatus is folded open and used by any angle, the locating effect and the stability of use of the electronic apparatus may be affected. Moreover, the two opposite guide threaded rods necessitate longer operation travel. This is unbeneficial to the miniaturization of the dual-shaft torque hinge.

Patent No. WO2005/101963 discloses a dual-shaft mechanism employing multiple conical (or bevel) gears to transmit power for synchronously rotating the two rotary shafts. The application of the conical gears is advantageous in that the power can be more stably transmitted. However, as well known by those who are skilled in this field, in application of the conical gears for transmitting power, the conical gears must have a sufficiently long cone distance or face distance. In addition, the engaged gears must be right aligned with each other. Therefore, the assembly of the conical gears necessitates higher axial precision for providing good and smooth engagement and transmission effect. In the above dual-shaft hinge, in the case that the middle conical gears are disposed between the lateral sides of the parallel rotary shafts for transmitting the power, due to the cone distance or the face distance, it will be impossible to minimize the distance between the two rotary shafts. Reversely, in the case that the middle conical gears are changed to be disposed at the end sections of the two parallel rotary shafts, more space at the end sections of the two parallel rotary shafts will be occupied. As a result, the entire transmission mechanism or structure will have a larger volume to occupy more room. Especially, the transmission mechanism applied to the notebook or a mini-type electronic apparatus fails to meet the requirements of lightweight and thinning of the electronic apparatus. This is not what we expect.

According to the above, with respect to the transmission mechanism that simply employs spur gear set or slide member or roller member between the two parallel rotary shafts, it is more possible to reduce the use space. However, due to the gaps between the teeth and the slide member, the synchrony and stability of operation of the two parallel rotary shafts will be both ill affected. With respect to the transmission mechanism employing conical (bevel) gears as the transmission members, a better contact and transmission stability can be achieved. However, such transmission mechanism is disadvantageous in that the volume of the electronic apparatus will be increased and more room is occupied. All the above problems still need to be overcome.

SUMMARY OF THE INVENTION

It is therefore a primary object of the present invention to provide a pivot mechanism of the synchronous hinge device, which is applied to a foldable electronic apparatus. The pivot mechanism can shorten the distance between two shafts of the dual-shaft hinge and stably transmit power by high contact ratio, whereby the electronic device can have a miniaturized and lightweight structure and can be smoothly rotated. The pivot mechanism includes a driver disposed on a first shaft and a reactor disposed on a second shaft and a link unit. Spur gears and conical (bevel) gears are respectively disposed at two ends of the link unit and the driver and the reactor. The Spur gears and conical (bevel) gears are engaged with each other to transmit power. The spur gears and conical (bevel) gears can be smoothly engaged with each other to form a stable, miniaturized and lightweight synchronous transmission device to overcome the shortcomings of the conventional device. When the first shaft drives the driver to rotate, the driver drives the link unit to rotate. At this time, the reactor is driven by the link unit to rotate in a direction reverse to the rotational direction of the driver. Accordingly, the first and second shafts can be synchronously rotated in reverse directions.

In the above pivot mechanism of the synchronous hinge device, the synchronous transmission device is disposed between a main fixing plate and a subsidiary fixing plate. The link unit is pivotally disposed between the base sections of the main fixing plate and the subsidiary fixing plate. The base sections are formed with grooves for lowering the frictional force against the link unit. A lubricant or the like can be filled in the grooves to keep the link unit more smoothly rotated between the base sections.

The present invention can be best understood through the following description and accompanying drawings, wherein:

DETAILED DESCRIPTION OF THE PREFERRED EMBODIMENTS

Figure 1:
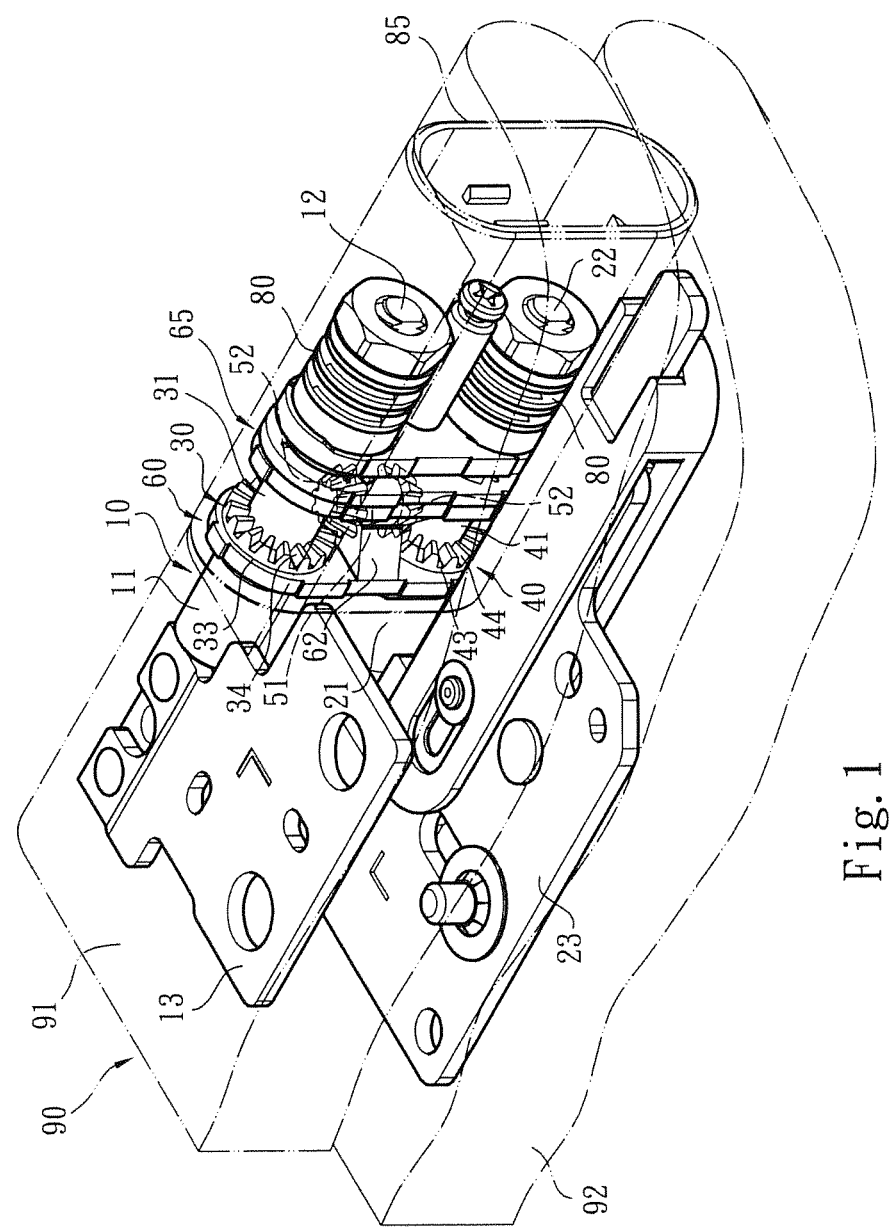
FIG. 1 is a perspective assembled view of a first embodiment of the present invention, in which the phantom lines show that an electronic apparatus is positioned in a closed position and show the relationship between the electronic apparatus and the first and second shafts.
Figure 2:
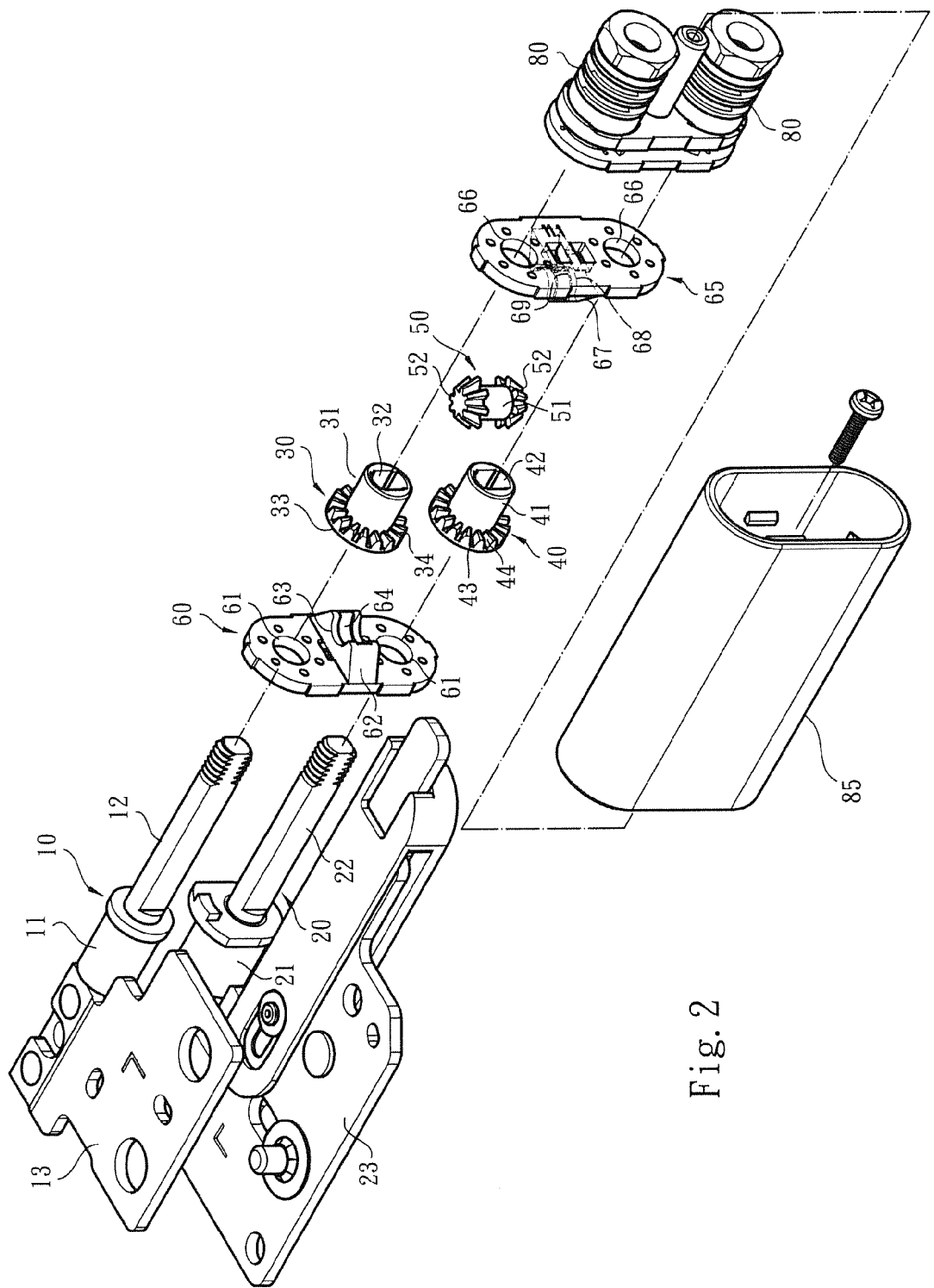
FIG. 2 is a perspective exploded view of the first embodiment of the present invention, showing the structural form of the first and second shafts, the driver, the link unit, the reactor, the main fixing plate, the subsidiary fixing plate and the torque modules.
Figure 3:
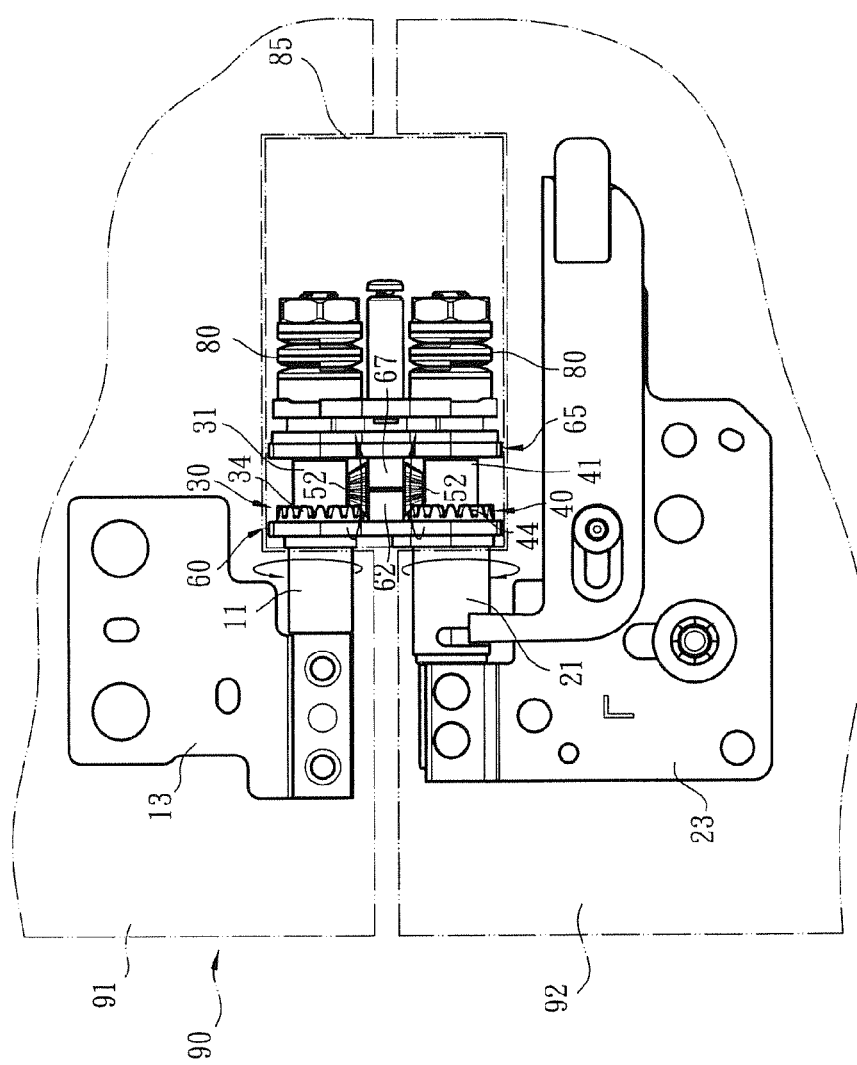
FIG. 3 is a plane view according to FIG. 1, showing that the first shaft and the driver are 90-degree rotated and the link unit drives the reactor and the second shaft to synchronously 90-degree rotate in a reverse direction.

Please refer to FIGS. 1, 2 and 3. The pivot mechanism of synchronous hinge device of the present invention includes a first shaft 10 and a second shaft 20. Each of the first and second shafts 10, 20 has a fixed section 11, 21 and a pivoted section 12, 22. The fixed sections 11, 21 are assembled with fixing seats 13, 23 to respectively fix the first and second shafts 10, 20 on a display module 91 and an apparatus body module 92 of an electronic apparatus 90 (such as a mobile phone, a computer or the like). The pivoted sections 12, 22 of the first and second shafts 10, 20 are respectively assembled with torque modules 80. Accordingly, when the action force applied to the display module 91 and the apparatus body module 92 by a user for rotating the same disappears, the display module 91 and the apparatus body module 92 are immediately located.

As shown in FIGS. 1, 2 and 3, a synchronous transmission device is disposed on the pivoted sections 12, 22 of the first and second shafts. The synchronous transmission device includes a driver 30 disposed on and assembled with the pivoted end 12 of the first shaft and drivable by or rotatable with the first shaft 10, a reactor 40 disposed on and assembled with the pivoted end 22 of the second shaft and drivable by or rotatable with the second shaft 20, and a link unit 50 disposed and connected between the driver 30 and the reactor 40. When the first shaft 10 drives the driver 30 to rotate, the driver 30 drives and rotates the link unit 50. At the same time, the link unit 50 drives the reactor 40 and the second shaft 20 to rotate in a direction reverse to the rotational direction of the driver 30. Accordingly, the first and second shafts 10, 20 can be synchronously rotated in reverse directions.

To speak more specifically, each of the driver 30 and the reactor 40 includes a shaft section 31, 41 in parallel to each other and a shaft hole 32, 42 formed on the shaft section 31, 41. The pivoted sections 12, 22 of the first and second shafts 10, 20 are fixedly fitted in the shaft holes 32, 42 of the driver 30 and the reactor 40. Accordingly, the driver 30 and the first shaft 10 and the reactor 40 and the second shaft 20 are synchronously rotatable. One end of the shaft section 31 of the driver 30 is provided with a disc 33. Also, one end of the shaft section 41 of the reactor 40 is provided with a disc 43. Each of the discs 33, 43 is formed with a spur crown gear 34, 44. As shown in the drawings, in this embodiment, the outer diameter of the disc 33 (or 43) is larger than the outer diameter of the shaft section 31 (or 41). The discs 33, 43 are disposed at the ends of the shaft sections 31, 41. Alternatively, the discs 33, 43 can be directly disposed on the end faces of the shaft sections 31, 41 (not shown).

As shown in the drawings, the link unit 50 includes a shaft section 51 normal to the shaft sections 31, 41 of the driver 30 and the reactor 40. The link unit 50 has conical (bevel) gear structures 52 at two ends of the shaft section 51 corresponding to the spur crown gears 34, 44 of the driver 30 and the reactor 40 for engaging with the spur crown gears 34, 44 of the driver 30 and the reactor 40.

In a preferred embodiment, the synchronous transmission device is disposed between a main fixing plate 60 and a subsidiary fixing plate 65. The main fixing plate 60 and the subsidiary fixing plate 65 can have identical structure so that these two components can be manufactured with the same mold to lower the mold design and development cost. The upper and lower sections of the main fixing plate 60 and the subsidiary fixing plate 65 are respectively formed with perforations 61, 66. The first and second shafts 10, 20 are passed through the perforations 61, 66 to fit the main fixing plate 60 and the subsidiary fixing plate 65 on the first and second shafts 10, 20. Each of the main fixing plate 60 and the subsidiary fixing plate 65 has a mountain-shaped base section 62, 72 for together pivotally connecting with the link unit 50, permitting the link unit 50 to rotate between the base sections 62, 67.

To speak more specifically, each of the base sections 62, 67 of the main fixing plate 60 and the subsidiary fixing plate 65 has a recess 63, 68. The recesses 63, 68 of the base sections 62, 67 of the main fixing plate 60 and the subsidiary fixing plate 65 together form a circular hollow in which the shaft section 51 of the link unit 50 is pivotally fitted. In addition, a groove 64, 69 is formed on each of the recesses 63, 68 of the base sections 62, 67 of the main fixing plate 60 and the subsidiary fixing plate 65. The grooves 64, 69 can lower the frictional force against the shaft section 51 of the link unit 50. Alternatively, a lubricant or the like can be filled in the grooves 64, 69 to ensure that the link unit 50 is smoothly rotated between the base sections 62, 67.

In a preferred embodiment, the pivoted sections 12, 22 of the first and second shafts, the main fixing plate 60, the driver 30, the reactor 40, the link unit 50, the subsidiary fixing plate 65 and the torque modules 80 are all mounted in a case 85.

Please refer to FIGS. 1 and 3. When a user operates the display module 91 to drive and rotate the first shaft 10 and the driver 30 from a closed position of FIG. 1 to a 90-degree opened position of FIG. 3, the spur crown gear 34 of the disc 33 of the driver 30 drives and rotates the conical (bevel) gear structure 52 of one end of the link unit 50. At the same time, the conical (bevel) gear structure 52 of the other end of the link unit 50 is rotated to drive the spur crown gear 44 of the disc 43 of the reactor 40 and the second shaft 20 to synchronously rotate. Therefore, the apparatus body module 92 is also 90-degree rotated and opened. It should be noted that in the case that the display module 91, the first shaft 10 and the driver 30 are 180-degree rotated, the link unit 50 will drive the reactor 40, the second shaft 20 and the apparatus body module 92 to 180-degree rotate.

Figure 4:
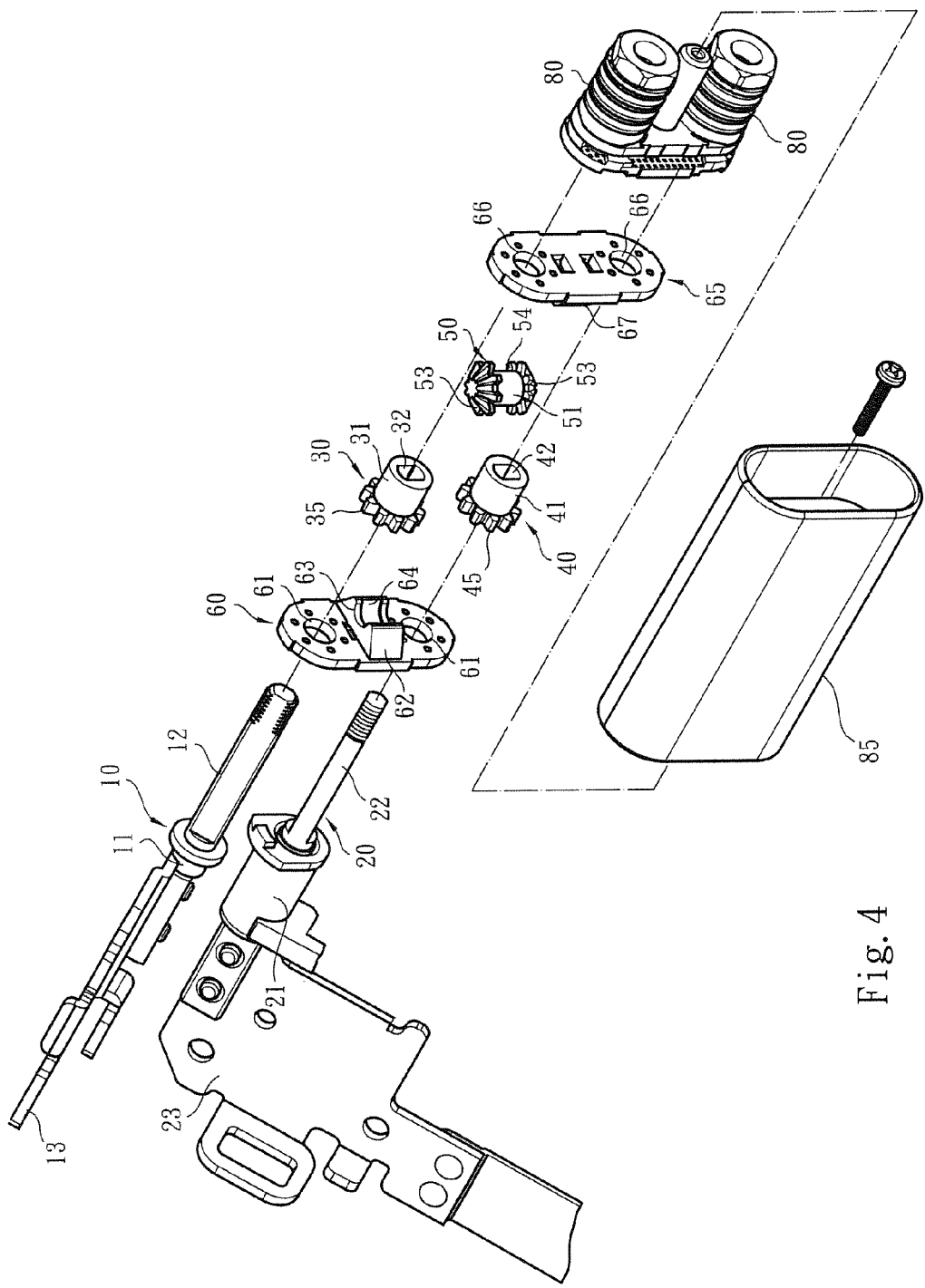
FIG. 4 is a perspective exploded view of a second embodiment of the present invention.
Figure 5:
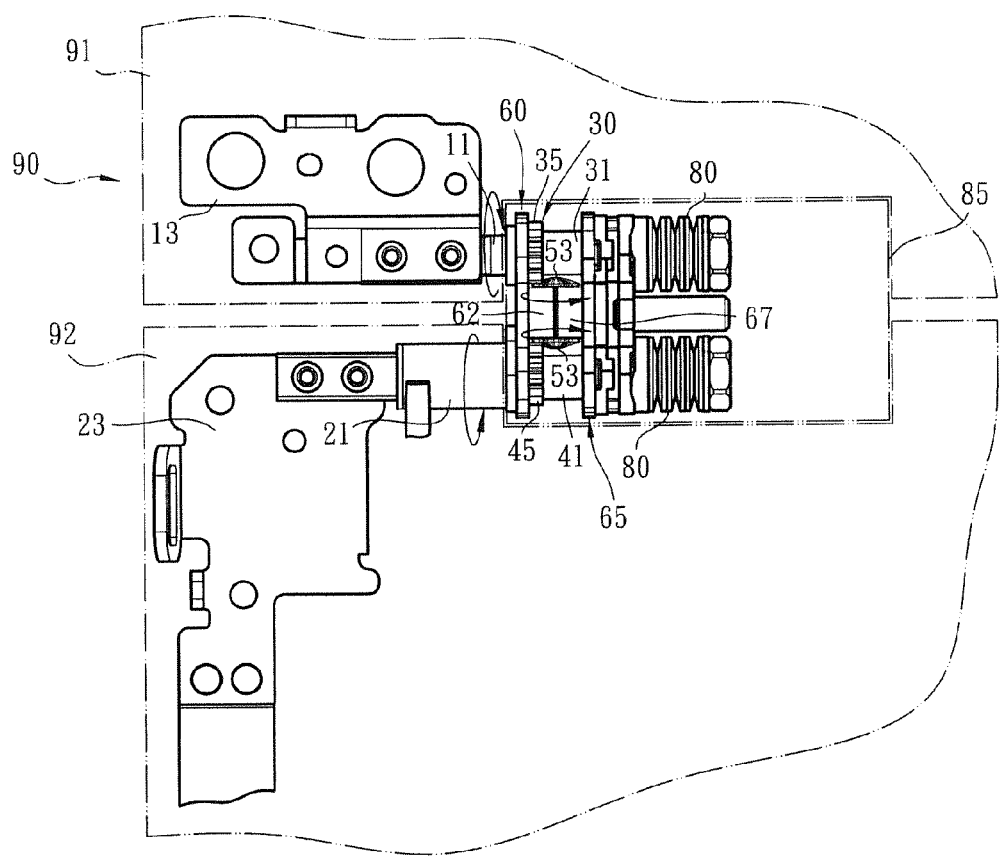
FIG. 5 is a plane view according to FIG. 4, showing that the first shaft and the driver are 90-degree rotated and the link unit drives the reactor and the second shaft to synchronously 90-degree rotate in a reverse direction, in which the phantom lines show the positional relationship between the electronic apparatus and the first and second shafts.

Please now refer to FIGS. 4 and 5, which show a second embodiment of the present invention. In the second embodiment, a spur gear 35, 45 is formed at one end of each of the driver 30 and the reactor 40. The link unit 50 has conical (bevel) gear structures 53 at two ends corresponding to the spur gears 35, 45 of the driver 30 and the reactor 40 for engaging with the spur gears 35, 45 of the driver 30 and the reactor 40.

In a modified embodiment, each of two ends of the link unit 50 is formed with a shoulder section 54. The conical (bevel) gear structures 53 are disposed on the shoulder sections 54. The shoulder section 54 has a width or diameter larger than the width of diameter of the shaft section 51 of the link unit 50.

It should be noted that in comparison with the simple engagement between multiple spur gears or conical gears, the spur crown gears 34, 44 or spur gears 35, 45 of the driver 30 and the reactor 40 are well engaged with the conical (bevel) gear structures 52, 53 of the link unit 50 with a shortened tooth face length to achieve a good transmission effect. Moreover, the teeth of the conical (bevel) gear structures are gradually engaged with the teeth of the spur gears to reduce the gap between the teeth. This can more smoothly transmit the power. In this case, the distance between the axes of the first and second shafts 10, 20 is as minified as possible to enhance the transmission stability.

In comparison with the conventional device, the pivot mechanism of the synchronous hinge device of the present invention can be synchronously and stably operated and has the following advantages:

1. In the pivot mechanism of the synchronous hinge device of the present invention, the spur gears 35, 45 are disposed on the shaft sections 31, 41 of the driver 30 and the reactor 40. Alternatively, the spur crown gears 34, 44 are disposed on the discs 33, 43. The conical (bevel) gears 52, 53 are disposed on the shaft section 51 of the link unit 50 for engaging with the spur gears 35, 45 or the spur crown gears 34, 44. The mountain-shaped base sections 62, 67 of the main fixing plate 60 and the subsidiary fixing plate 65 are formed with recesses 63, 68 in which shaft section 51 of the link unit 50 is rotatably disposed. The components of the pivot mechanism of the synchronous hinge device of the present invention are redesigned and are obviously different from the engagement between the spur gears or conical (bevel) gears of the conventional device for transmitting the power. The spur gears and the conical (bevel) gears of the present invention are smoothly engaged with each other to eliminate the shortcomings of the conventional device. In addition, the power can be more stably transmitted to truly synchronously rotate the first and second shafts.

2. In the pivot mechanism of the synchronous hinge device of the present invention, the driver 30, the reactor 40, the link unit 30, the main fixing plate 60 and the subsidiary fixing plate 65 are cooperatively assembled with each other to achieve a transmission effect. In comparison with the conventional device, the teeth of the conical (bevel) gears and the teeth of the spur gears have corresponding oblique guide faces so that the conical (bevel) gears and the spur gears can be easily assembled. Moreover, the teeth of the spur gears and the teeth of the conical (bevel) gears are well engaged with each other so that the distance between the axes of the first and second shafts 10, 20 can be minimized to reduce the occupied room or the volume of the entire transmission device. This meets the requirements of lightweight, miniaturization and thinness of electronic apparatus.

In conclusion, the pivot mechanism of the synchronous hinge device of the present invention is designed with a novel structure for effectively transmitting power and is advantageous over the conventional device.

The above embodiments are only used to illustrate the present invention, not intended to limit the scope thereof. Many modifications of the above embodiments can be made without departing from the spirit of the present invention. For example, the spur gears or spur crown gears and the conical (bevel) gear structures can be switched in arrangement. (That is, the conical (bevel) gear structures can be changed to be disposed on the driver 30 or the reactor 40, while the spur gears can be changed to be disposed on the link unit 50).

What is claimed is:

1. A pivot mechanism of synchronous hinge device, comprising:
   a first shaft having a fixed section and a pivoted section;
   a second shaft having a fixed section and a pivoted section;
   a driver having a shaft section and a shaft hole formed on the shaft section, a spur gear structure being disposed on the shaft section of the driver, the pivoted section of the first shaft being fitted in the shaft hole of the driver to non-rotatably mount the driver on the pivoted section of the first shaft;
   a reactor having a shaft section and a shaft hole formed on the shaft section, the shaft section of the reactor being parallel to the shaft section of the driver, a spur gear structure being disposed on the shaft section of the reactor, the pivoted section of the second shaft being fitted in the shaft hole of the reactor to non-rotatably mount the reactor on the pivoted section of the second shaft; and
   a link unit including a shaft section drivingly positioned between the driver and the reactor, the link unit further including conical gear structures at respective ends of the shaft section, the conical gear structures being engaged with the spur gear structures of the driver and the reactor, whereby via the link unit, the first shaft with the driver and the second shaft with the reactor can be synchronously rotated in reverse directions;
   wherein the spur gear structure includes a disc disposed at at least one of one end of the shaft section of the driver and one end of the shaft section of the reactor, and a spur crown gear is disposed on the disc.

2. The pivot mechanism of the synchronous hinge device as claimed in claim 1, wherein the spur gear structure includes a spur gear disposed at at least one of one end of the shaft section of the driver and one end of the shaft section of the reactor.

3. The pivot mechanism of the synchronous hinge device as claimed in claim 2, wherein the driver, the reactor and the link unit are disposed between a main fixing plate and a subsidiary fixing plate, upper and lower sections of the main fixing plate and the subsidiary fixing plate being respectively formed with perforations, the pivoted sections of the first and second shafts being passed through the perforations to fit the main fixing plate and the subsidiary fixing plate on the first and second shafts, each of the main fixing plate and the subsidiary fixing plate having a base section and a recess formed on the base section for together pivotally connecting with the shaft section of the link unit, permitting the link unit to rotate between the base sections.

4. The pivot mechanism of the synchronous hinge device as claimed in claim 2, wherein the fixed sections of the first and second shafts are assembled with fixing seats to respectively fix the first and second shafts on a display module and an apparatus body module of an electronic apparatus.

5. The pivot mechanism of the synchronous hinge device as claimed in claim 1, wherein the driver, the reactor and the link unit are disposed between a main fixing plate and a subsidiary fixing plate, upper and lower sections of the main fixing plate and the subsidiary fixing plate being respectively formed with perforations, the pivoted sections of the first and second shafts being passed through the perforations to fit the main fixing plate and the subsidiary fixing plate on the first and second shafts, each of the main fixing plate and the subsidiary fixing plate having a base section and a recess formed on the base section for together pivotally connecting with the shaft section of the link unit, permitting the link unit to rotate between the base sections.

6. The pivot mechanism of the synchronous hinge device as claimed in claim 5, wherein the recesses of the main fixing plate and the subsidiary fixing plate together form a circular hollow in which the shaft section of the link unit is pivotally fitted, a groove being formed on each of the recesses of the base sections of the main fixing plate and the subsidiary fixing plate.

7. The pivot mechanism of the synchronous hinge device as claimed in claim 6, wherein the fixed sections of the first and second shafts are assembled with fixing seats to respectively fix the first and second shafts on a display module and an apparatus body module of an electronic apparatus.

8. The pivot mechanism of the synchronous hinge device as claimed in claim 5, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case.

9. The pivot mechanism of the synchronous hinge device as claimed in claim 8, wherein the fixed sections of the first and second shafts are assembled with fixing seats to respectively fix the first and second shafts on a display module and an apparatus body module of an electronic apparatus.

10. The pivot mechanism of the synchronous hinge device as claimed in claim 5, wherein the fixed sections of the first and second shafts are assembled with fixing seats to respectively fix the first and second shafts on a display module and an apparatus body module of an electronic apparatus.

11. The pivot mechanism of the synchronous hinge device as claimed in claim 1, wherein the driver, the reactor and the link unit are disposed between a main fixing plate and a subsidiary fixing plate, upper and lower sections of the main fixing plate and the subsidiary fixing plate being respectively formed with perforations, the pivoted sections of the first and second shafts being passed through the perforations to fit the main fixing plate and the subsidiary fixing plate on the first and second shafts, each of the main fixing plate and the subsidiary fixing plate having a base section and a recess formed on the base section for together pivotally connecting with the shaft section of the link unit, permitting the link unit to rotate between the base sections.

12. The pivot mechanism of the synchronous hinge device as claimed in claim 1, wherein the fixed sections of the first and second shafts are assembled with fixing seats to respectively fix the first and second shafts on a display module and an apparatus body module of an electronic apparatus.

13. The pivot mechanism of the synchronous hinge device as claimed in claim 1, wherein the fixed sections of the first and second shafts are assembled with fixing seats to respectively fix the first and second shafts on a display module and an apparatus body module of an electronic apparatus.

14. A pivot mechanism of synchronous hinge device, comprising:
   a first shaft having a fixed section and a pivoted section;
   a second shaft having a fixed section and a pivoted section;
   a driver having a shaft section and a shaft hole formed on the shaft section, a conical gear structure being disposed on the shaft section of the driver, the pivoted section of the first shaft being fitted in the shaft hole of the driver to non-rotatably mount the driver on the pivoted section of the first shaft;
   a reactor having a shaft section and a shaft hole formed on the shaft section, the shaft section of the reactor being parallel to the shaft section of the driver, a conical gear structure being disposed on the shaft section of the reactor, the pivoted section of the second shaft being fitted in the shaft hole of the reactor to non-rotatably mount the reactor on the pivoted section of the second shaft; and
   a link unit including a shaft section drivingly positioned between the driver and the reactor, the link unit further including spur gear structures at respective ends of the shaft section, the spur gear structures being engaged with the conical gear structures of the driver and the reactor, whereby via the link unit, the first shaft with the driver and the second shaft with the reactor can be synchronously rotated in reverse directions;
   wherein the spur gear structure includes a disc disposed at at least one end of the shaft section of the link unit, and a spur crown gear is disposed on the disc.

15. The pivot mechanism of the synchronous hinge device as claimed in claim 14, wherein the spur gear structure includes a spur gear disposed at at least one end of the shaft section of the link unit.

16. The pivot mechanism of the synchronous hinge device as claimed in claim 15, wherein the driver, the reactor and the link unit are disposed between a main fixing plate and a subsidiary fixing plate, upper and lower sections of the main fixing plate and the subsidiary fixing plate being respectively formed with perforations, the pivoted sections of the first and second shafts being passed through the perforations to fit the main fixing plate and the subsidiary fixing plate on the first and second shafts, each of the main fixing plate and the subsidiary fixing plate having a base section and a recess formed on the base section for together pivotally connecting with the shaft section of the link unit, permitting the link unit to rotate between the base sections.

17. The pivot mechanism of the synchronous hinge device as claimed in claim 15, wherein the fixed sections of the first and second shafts are assembled with fixing seats to respectively fix the first and second shafts on a display module and an apparatus body module of an electronic apparatus.

18. The pivot mechanism of the synchronous hinge device as claimed in claim 14, wherein the driver, the reactor and the link unit are disposed between a main fixing plate and a subsidiary fixing plate, upper and lower sections of the main fixing plate and the subsidiary fixing plate being respectively formed with perforations, the pivoted sections of the first and second shafts being passed through the perforations to fit the main fixing plate and the subsidiary fixing plate on the first and second shafts, each of the main fixing plate and the subsidiary fixing plate having a base section and a recess formed on the base section for together pivotally connecting with the shaft section of the link unit, permitting the link unit to rotate between the base sections.

19. The pivot mechanism of the synchronous hinge device as claimed in claim 18, wherein the recesses of the main fixing plate and the subsidiary fixing plate together form a circular hollow in which the shaft section of the link unit is pivotally fitted, a groove being formed on each of the recesses of the base sections of the main fixing plate and the subsidiary fixing plate.

20. The pivot mechanism of the synchronous hinge device as claimed in claim 19, wherein the fixed sections of the first and second shafts are assembled with fixing seats to respectively fix the first and second shafts on a display module and an apparatus body module of an electronic apparatus.

21. The pivot mechanism of the synchronous hinge device as claimed in claim 18, wherein each of the pivoted sections of the first and second shafts is assembled with a torque module, the pivoted sections of the first and second shafts, the main fixing plate, the driver, the reactor, the link unit, the subsidiary fixing plate and the torque modules being mounted in a case.

22. The pivot mechanism of the synchronous hinge device as claimed in claim 21, wherein the fixed sections of the first and second shafts are assembled with fixing seats to respectively fix the first and second shafts on a display module and an apparatus body module of an electronic apparatus.

23. The pivot mechanism of the synchronous hinge device as claimed in claim 18, wherein the fixed sections of the first and second shafts are assembled with fixing seats to respectively fix the first and second shafts on a display module and an apparatus body module of an electronic apparatus.

24. The pivot mechanism of the synchronous hinge device as claimed in claim 14, wherein the driver, the reactor and the link unit are disposed between a main fixing plate and a subsidiary fixing plate, upper and lower sections of the main fixing plate and the subsidiary fixing plate being respectively formed with perforations, the pivoted sections of the first and second shafts being passed through the perforations to fit the main fixing plate and the subsidiary fixing plate on the first and second shafts, each of the main fixing plate and the subsidiary fixing plate having a base section and a recess formed on the base section for together pivotally connecting with the shaft section of the link unit, permitting the link unit to rotate between the base sections.

25. The pivot mechanism of the synchronous hinge device as claimed in claim 14, wherein the fixed sections of the first and second shafts are assembled with fixing seats to respectively fix the first and second shafts on a display module and an apparatus body module of an electronic apparatus.

26. The pivot mechanism of the synchronous hinge device as claimed in claim 14, wherein the fixed sections of the first and second shafts are assembled with fixing seats to respectively fix the first and second shafts on a display module and an apparatus body module of an electronic apparatus.

* * * * *